United States Patent [19]

Hirayama et al.

[11] Patent Number: 5,554,342
[45] Date of Patent: Sep. 10, 1996

[54] ELECTRICAL HEATING TYPE CATALYTIC DEVICE

[75] Inventors: Hiroshi Hirayama; Kouji Yoshizaki; Kouhei Igarashi, all of Susono; Keiji Ito, Nagoya; Tohru Yoshinaga; Kiyohiko Watanabe, both of Okazaki; Yukihiro Shinohara, Anjyo; Osamu Fujishiro, Nagoya, all of Japan

[73] Assignees: Toyota Jidosha Kabushiki Kaisha, Toyota; Nippon Soken, Inc., Nishio; Nippondenso Co., Ltd., Kariya, all of Japan

[21] Appl. No.: 457,754

[22] Filed: Jun. 1, 1995

Related U.S. Application Data

[63] Continuation of Ser. No. 228,174, Apr. 15, 1994, abandoned, which is a continuation of Ser. No. 995,648, Dec. 18, 1992, abandoned.

[30] Foreign Application Priority Data

Dec. 20, 1991 [JP] Japan ................................. 3-338556
Dec. 21, 1991 [JP] Japan ................................. 3-339138
Dec. 26, 1991 [JP] Japan ................................. 3-344865

[51] Int. Cl.⁶ ............................ F01N 3/10; B01D 50/00
[52] U.S. Cl. ........................... 422/174; 422/179; 422/180; 60/300
[58] Field of Search ........................... 422/174, 179, 422/180; 60/299, 300; 55/DIG. 30

[56] References Cited

U.S. PATENT DOCUMENTS

| | | |
|---|---|---|
| 3,770,389 | 10/1973 | Kitzner et al. ............... 60/300 |
| 3,979,905 | 9/1976 | Masaki et al. . |
| 4,220,625 | 9/1980 | Toh et al. ............... 422/180 |
| 4,719,680 | 1/1988 | Cyron ............... 29/157 R |
| 4,901,904 | 2/1990 | Tsuno ............... 228/56.3 |
| 4,928,485 | 5/1990 | Whittenberger . |
| 4,958,428 | 9/1990 | Humpolik ............... 29/820 |
| 5,050,790 | 9/1991 | Takikawa et al. ............... 288/181 |
| 5,055,275 | 10/1991 | Kanniainen et al. ............... 422/180 |
| 5,063,029 | 11/1991 | Mizuno et al. . |
| 5,070,694 | 12/1991 | Whittenberger ............... 60/300 |
| 5,094,074 | 3/1992 | Nishizawa et al. ............... 60/300 |
| 5,146,743 | 9/1992 | Maus et al. . |
| 5,163,291 | 11/1992 | Hitachi et al. ............... 60/299 |
| 5,174,968 | 12/1992 | Whittenberger ............... 422/174 |
| 5,202,547 | 4/1993 | Abe et al. . |
| 5,215,722 | 6/1993 | Nishizawa ............... 422/174 |

FOREIGN PATENT DOCUMENTS

| | | |
|---|---|---|
| 503445 | 9/1992 | European Pat. Off. . |
| 567034 | 4/1993 | European Pat. Off. . |
| 2333092 | 1/1975 | Germany . |
| 4102890 | 8/1992 | Germany . |
| 63-67609 | 5/1988 | Japan . |
| 3-500911 | 2/1991 | Japan . |
| 92-18245 | 10/1992 | WIPO . |

*Primary Examiner*—Robert Warden
*Assistant Examiner*—Christopher Y. Kim
*Attorney, Agent, or Firm*—Kenyon & Kenyon

[57] ABSTRACT

An electrical heating type catalytic device having a metallic catalyst carrier constituted by layering metallic foils, surfaces of the metallic foils being coated by an insulation film, adjoining metallic foils being joined conductively in only some regions of the metallic catalyst carrier.

25 Claims, 20 Drawing Sheets

ELECTRICAL HEATING TYPE CATALYTIC DEVICE

This application is a continuation of application Ser. No. 08/228,174, filed on Apr. 15, 1994, abandoned which is a continuation of Ser. No. 07/995,648 filed on Dec. 18, 1992, abandoned.

BACKGROUND OF THE INVENTION

1. Field of the Invention

The present invention relates to an electrical heating type catalytic device.

2. Description of the Related Art

U.S. Pat. No. 3,770,389 discloses a conduction heating type catalytic converter wherein a columnar electrode is connected in the center of a metallic catalyst carrier, obtained by layering and winding a metallic corrugated sheet and flat sheet formed with insulation films on both surfaces so as to form alternate layers of corrugated sheet and flat sheet, a cylindrical electrode is connected at the outer periphery of the metallic catalyst carrier, a ceramic catalyst carrier is provided surrounding the metallic catalyst carrier, and a current is passed through the metallic catalyst carrier to heat it.

If the metallic corrugated sheet and flat sheet are joined by, for example, soldering, they become conductive, so if the corrugated sheet and the flat sheet are joined over the entire region of the metallic catalyst carrier, the electrical resistance of the metallic catalyst carrier falls too low and almost no heat is generated even if current is passed through them. Therefore, in the above-mentioned conventional catalytic converter, the corrugated sheet and the flat sheet are not joined over the entire region of the metallic catalyst carrier, whereby the metallic catalyst carrier is given an electrical resistance suitable for heat generation from the columnar electrode to the cylindrical electrode.

However, in this catalytic converter, since the corrugated sheet and the flat sheet are not joined over the entire region of the metallic catalyst carrier, when the catalytic converter is mounted in the exhaust system of an internal combustion engine and exposed to high temperatures, the temperature difference in the metallic catalyst carrier gives rise to thermal stress which causes a deviation of the corrugated sheet and flat sheet in the axial direction of the metallic catalyst carrier in addition to deviation derived from the exhaust pressure. Once this deviation occurs, it rapidly increases and gives rise to the problem of destruction of the metallic catalyst carrier.

SUMMARY OF THE INVENTION

An object of the present invention is to provide an electrical heating type catalytic device by which the above problems are solved.

According to the present invention, there is provided an electrical heating type catalytic device having a metallic catalyst carrier constituted by layering metallic foils, surfaces of the metallic foils being coated by an insulation film, adjoining metallic foils being joined conductively in only some regions of the metallic catalyst carrier.

The present invention may be more fully understood from the description of the preferred embodiments of the invention set forth below, together with the accompanying drawings.

DESCRIPTION OF THE PREFERRED EMBODIMENTS

Referring to FIGS. 1 to 4, an explanation will be made of a first embodiment. First, referring to FIG. 3, thin metallic corrugated sheets 1 and flat sheets 2 welded to a positive electrode 4 are layered and wound together to form spiral-like alternate layers, thereby forming a honeycomb shaped metallic catalyst carrier 3. The corrugated sheets 1 and the flat sheets 2 are, for example, foils of a thickness of about 50 µm having a composition of 20 percent chromium, 5 percent aluminum, and 75 percent iron. The surfaces of the corrugated sheets 1 and flat sheets 2 in nonjoined regions are treated in advance by an oxidizing treatment so as to form an alumina layer serving as an electrically insulating film.

Figure 1:
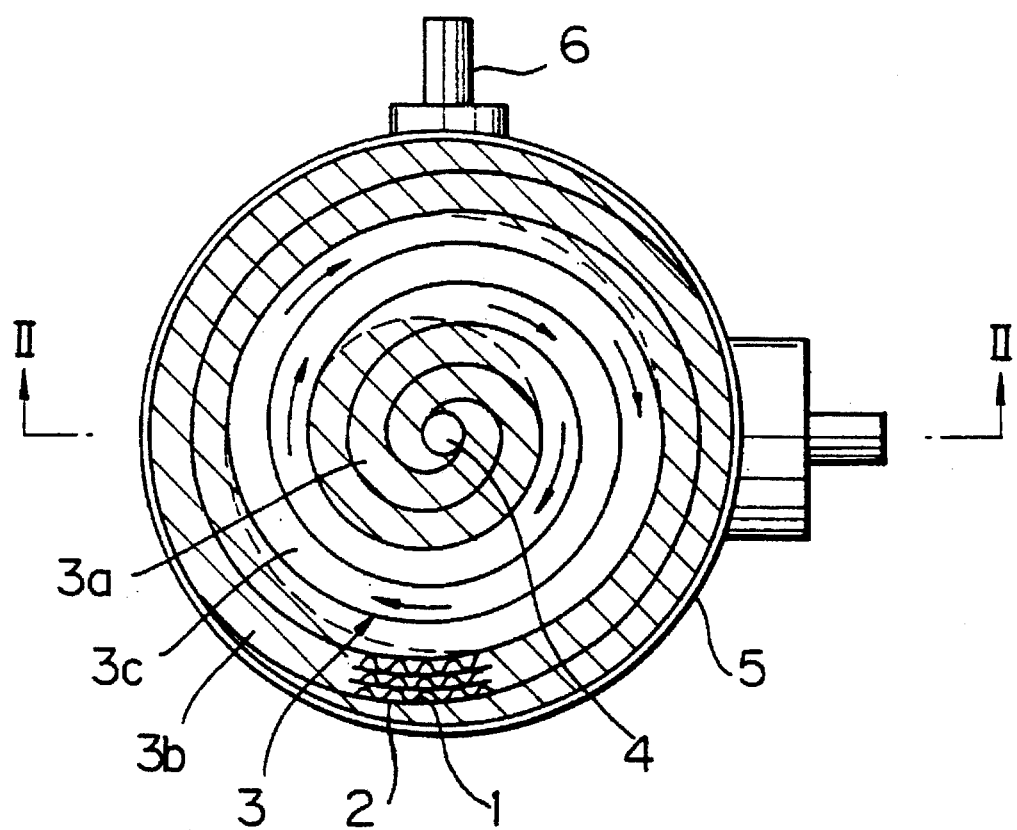
FIG. 1 is a view of a catalytic device of a first embodiment of the present invention, shown in FIG. 2, seen along the arrow I.
Figure 2:
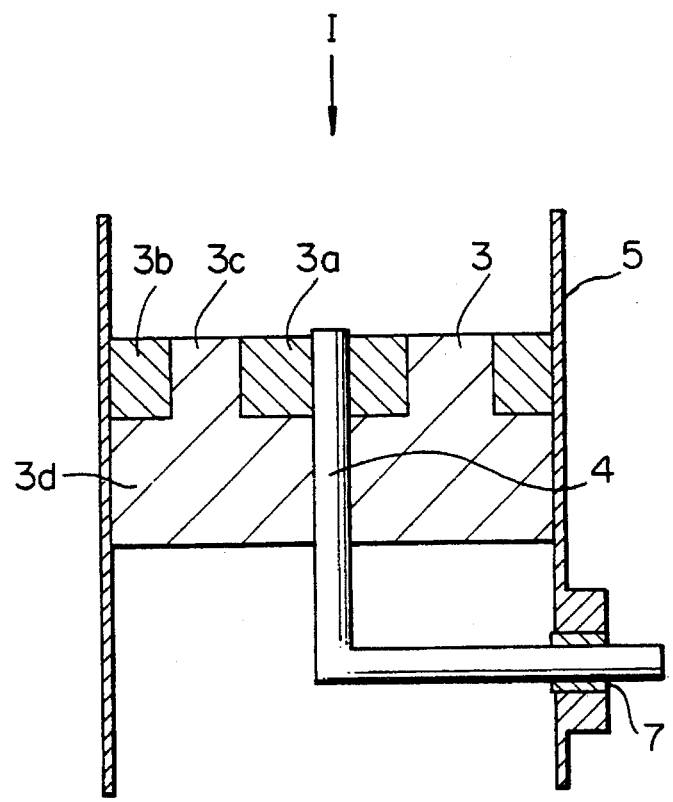
FIG. 2 is a cross-sectional view of the catalytic device taken along line II—II of FIG. 1.

Referring to FIG. 1 and FIG. 2, the positive electrode 4 is disposed at the center of a catalyst carrier 3 along its axial direction. The positive electrode 4 is connected in a conductive fashion to the catalyst carrier 3. The catalyst carrier 3 is inserted into a metallic cylindrical case 5 and affixed to the case 5 by, for example, soldering. The catalyst carrier 3 is made conductive with the case 5. As shown in FIG. 1, a negative electrode 6 is connected to the side of the case 5. As shown in FIG. 2, the positive electrode 4 extends in the axial direction of the case 5, then is bent in an L-shape and extends in the diametrical direction of the case 5 and passes through the side surface of the case 5. The positive electrode 4 is electrically insulated from the case 5 by an insulating material 7.

Referring to FIG. 1, in the cylindrical region 3a of the center of the catalyst carrier 3 and the cylindrical region 3b (hatched region in figure) at the outer periphery, the mountains and valleys of the corrugated sheet 1 are conductively joined to the flat sheet 2, for example, by brazing, electrodischarge welding, laser welding, etc. In the region 3c between the center joined region 3a and the outer peripheral joined region 3b, the corrugated sheet 1 and the flat sheet 2 are not joined and therefore the corrugated sheet 1 and the flat sheet 2 are insulated by the insulating film $Al_2O_3$. Further, it is possible not to join layers after the corrugated sheet 1 and the flat sheet 2 are joined to make the layers.

Referring to FIG. 2, the joined regions 3a and 3b are formed only at the upstream side of the flow of exhaust gas of the catalyst carrier 3. The downstream side 3d remains nonjoined across its entirety.

Note that the joined regions may be formed at both of the upstream end and the downstream end and may be formed across the entire length of the catalyst carrier 3 in the axial direction. A conduction heating type catalytic device is obtained by coating activated alumina etc. on the thus formed catalyst carrier 3 and carrying the catalytic component, that is, the precious (for example, Pt, Pd, Rh, etc.) on the same.

Figure 3:
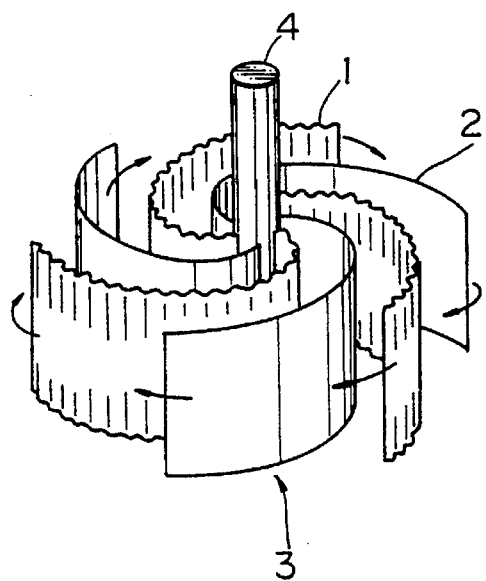
FIG. 3 is a view of the formation of a catalyst carrier obtained by layering and winding corrugated sheets and flat sheets.

The conduction heating type catalytic device shown from FIG. 1 to FIG. 3 is disposed in the exhaust passage of an internal combustion engine and the main catalytic device is disposed in the exhaust passage downstream of this conduction heating type catalytic device.

A catalyst cannot exhibit its exhaust gas purification action if it is not above the activation temperature. Therefore, when the engine is cold, current is run through the conduction heating type catalytic device to heat the catalyst to raise it above the activation temperature in a short time and thus enable purification of the harmful components in the exhaust gas.

Figure 4:
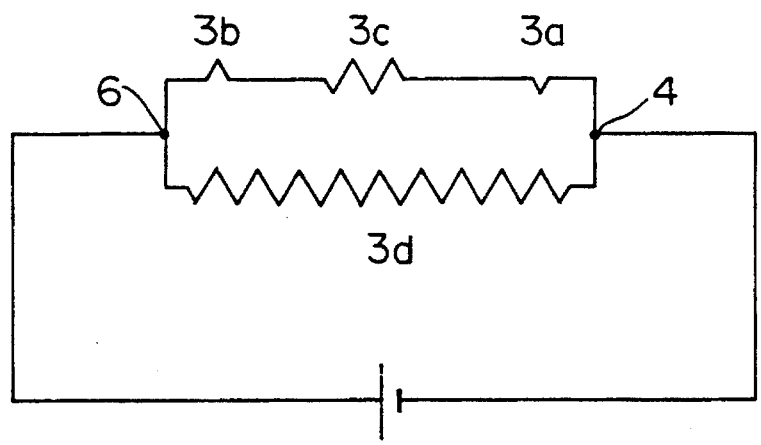
FIG. 4 is a view of a simple equivalent circuit of the catalytic device of the first embodiment.

FIG. 4 shows a simple equivalent circuit in the case of application of a DC voltage between the positive electrode 4 and the negative electrode 6. The center joined region 3a, the nonjoined region 3c, and the outer peripheral joined region 3b are connected in series, while these and the downstream side nonjoined region 3d are connected in parallel.

Since the corrugated sheets 1 and the flat sheets 2 are connected conductively at the center joined region 3a and the outer peripheral joined region 3b, the electrical resistance is low and therefore almost no heat is generated. On the other hand, at the nonjoined region 3c, since the corrugated sheets 1 and the flat sheets 2 are insulated from each other, the current path is formed long in length in a spiral shape along the corrugated sheets 1 and the flat sheets 2 as shown by the arrow in FIG. 1, so the electrical resistance becomes larger. Therefore, the nonjoined region 3c generates heat upon being run through with current and serves as a heat generating portion.

The downstream side nonjoined region 3d (see FIG. 2) has a large resistance compared with the nonjoined region 3c and thus the current flowing through the downstream side nonjoined region 3d becomes considerably smaller than the current flowing through the nonjoined region 3c. The amount of heat generated is expressed by $I^2R$ (I: current value and R: electrical resistance value), so the downstream side nonjoined region 3d does not generate much heat at all.

Therefore, when voltage is applied, the nonjoined region 3c generates heat and quickly reaches the catalyst activation temperature where it can purify the harmful substances in the exhaust gas. Further, when it reaches the catalyst activation temperature and the purification of the harmful substances in the exhaust gas is started, the regions other than the nonjoined region 3c also rise in temperature due to the heat of the catalytic reaction. Moreover, when the catalytic reaction of the electrically heating catalytic device progresses, the main catalytic converter can also be heated by the heat of the catalytic reaction of the same.

As explained above, according to this embodiment, even when the engine is cold, it is possible to immediately raise the nonjoined region 3c to the catalyst activation temperature by conduction heating of the nonjoined region 3c and therefore it is possible to quickly purify the exhaust gas.

Also, since a part of the catalyst carrier 3, that is, the nonjoined region 3c, is electrically heated, the amount of power required for heating the catalyst carrier can be vastly reduced.

Further, since the catalyst carrier 3 is joined at the joined regions 3a and 3b, even if the catalyst carrier 3 is exposed to high temperature exhaust gas, there is no deviation of the catalyst carrier 3 in the axial direction and therefore the strength of the catalyst carrier 3 can be improved.

Still further, in this embodiment, the heat generating portion 3c is formed at the upstream side of the catalyst carrier 3, so it is possible to heat the downstream portion of the catalyst carrier 3 by the heat of the catalytic reaction.

FIGS. 5 to 10 show second to fourth embodiments differing from the first embodiment in the joined regions.

Figure 5:
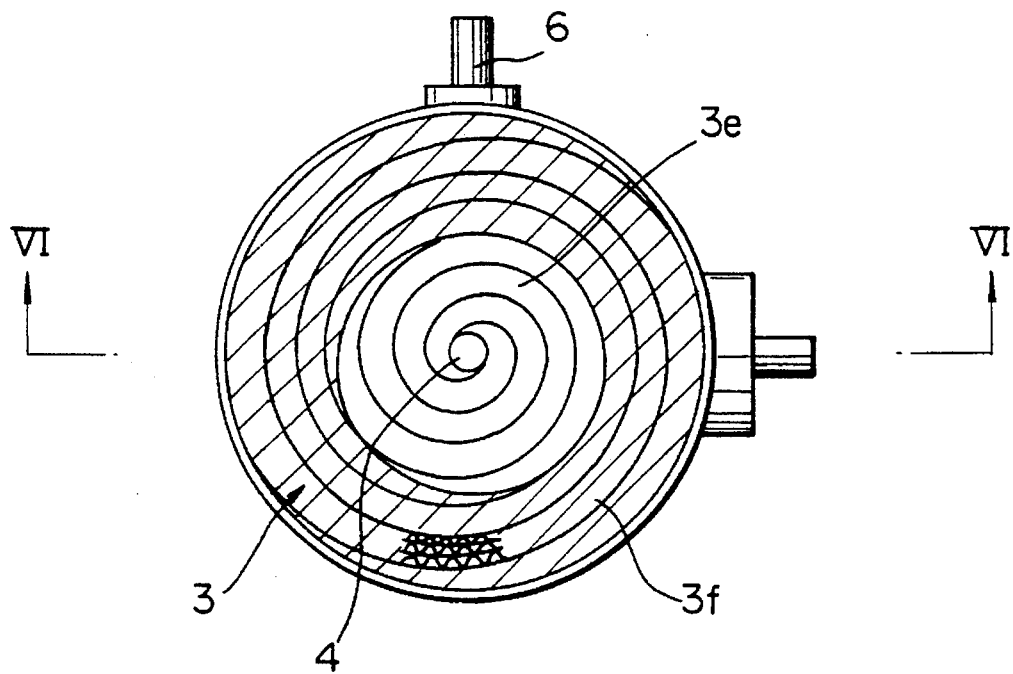
FIG. 5 is a view of the catalytic device of a second embodiment, shown in FIG. 6, seen along the arrow V.
Figure 6:
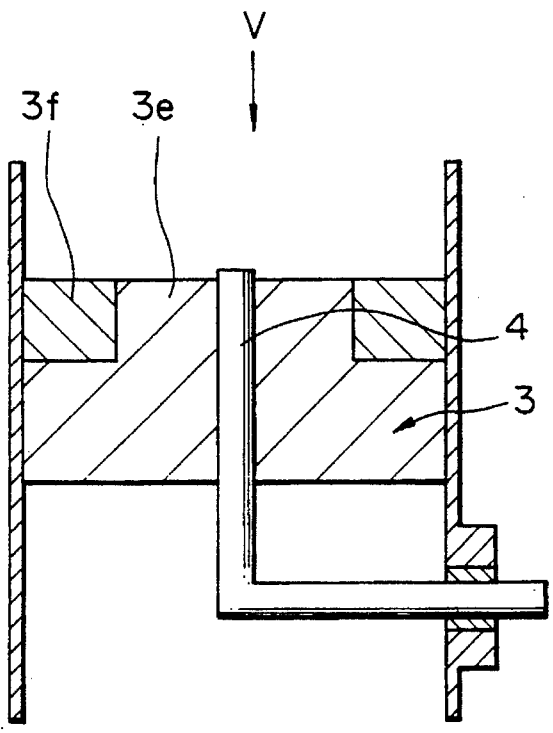
FIG. 6 is a cross-sectional view of the catalytic device taken along line VI—VI of FIG. 5.

In the second embodiment shown in FIGS. 5 and 6, the inner peripheral portion 3e is made the nonjoined region and the outer peripheral portion 3f is made the joined portion.

The distribution of the flow of exhaust gas is higher the closer to the center axis of the catalyst carrier 3. In this embodiment, the center portion of the catalyst carrier 3 is the heat generating portion, so it is possible to effectively purify the exhaust gas.

Figure 7:
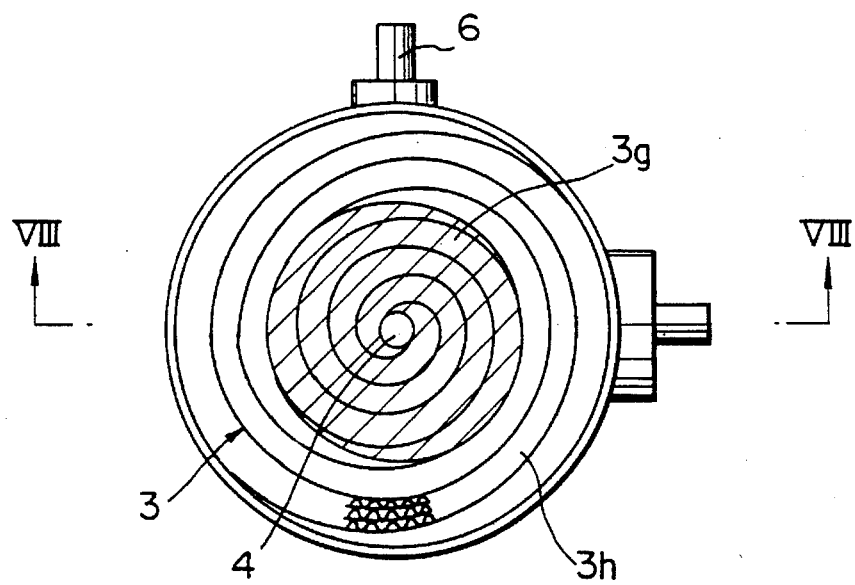
FIG. 7 is a view of the catalytic device of a third embodiment, shown in FIG. 8, seen along the arrow VII.
Figure 8:
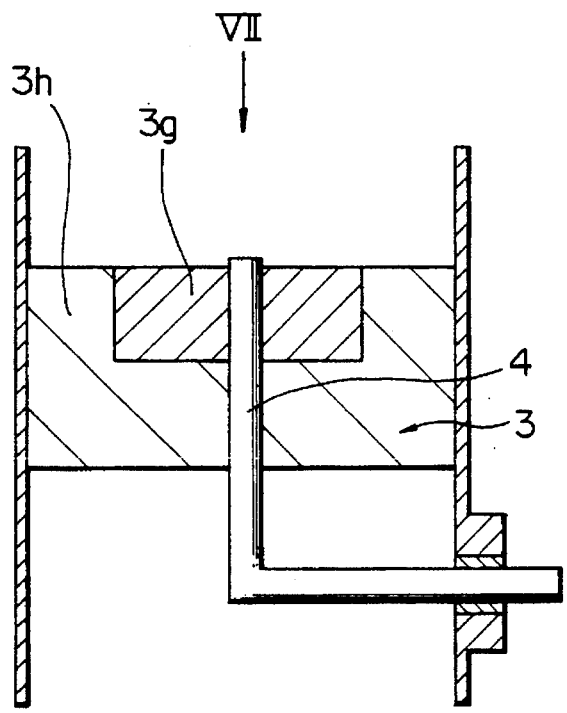
FIG. 8 is a cross-sectional view of the catalytic device taken along line VIII—VIII of FIG. 7.

In the third embodiment shown in FIGS. 7 and 8, conversely to the second embodiment, the inner peripheral portion 3g is made the joined region and the outer peripheral portion 3h is made the nonjoined region.

Figure 9:
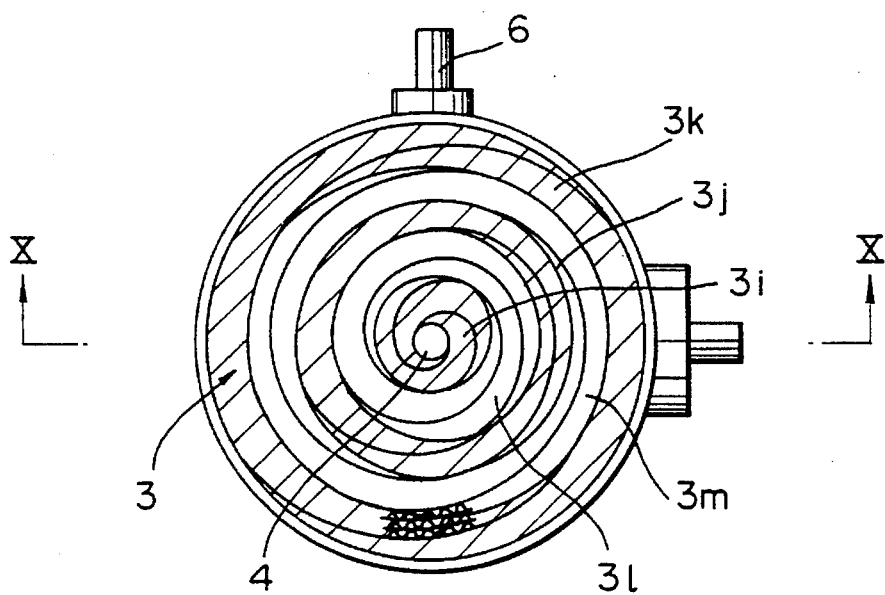
FIG. 9 is a view of the catalytic device of a fourth embodiment, shown in FIG. 10, seen along the arrow IX.
Figure 10:
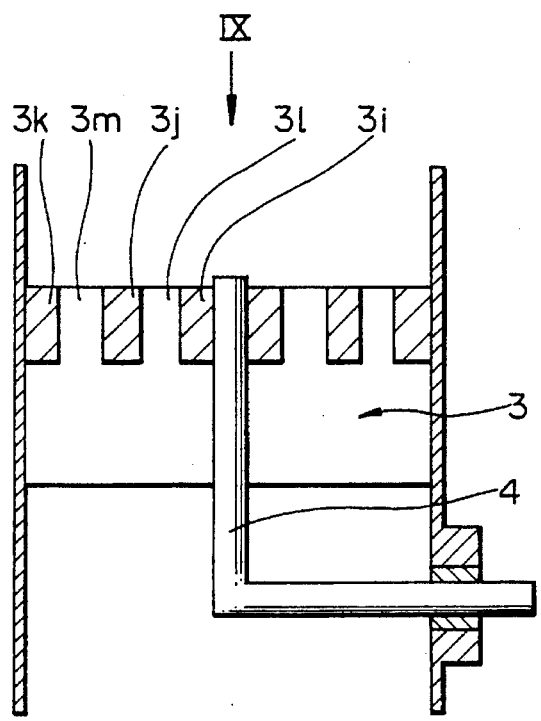
FIG. 10 is a cross-sectional view of the catalytic device taken along line X—X of FIG. 9.

In the fourth embodiment shown in FIGS. 9 and 10, annular shaped joined regions 3i, 3j, and 3k and annular shaped nonjoined regions 3l and 3m are alternately formed.

Figure 11:
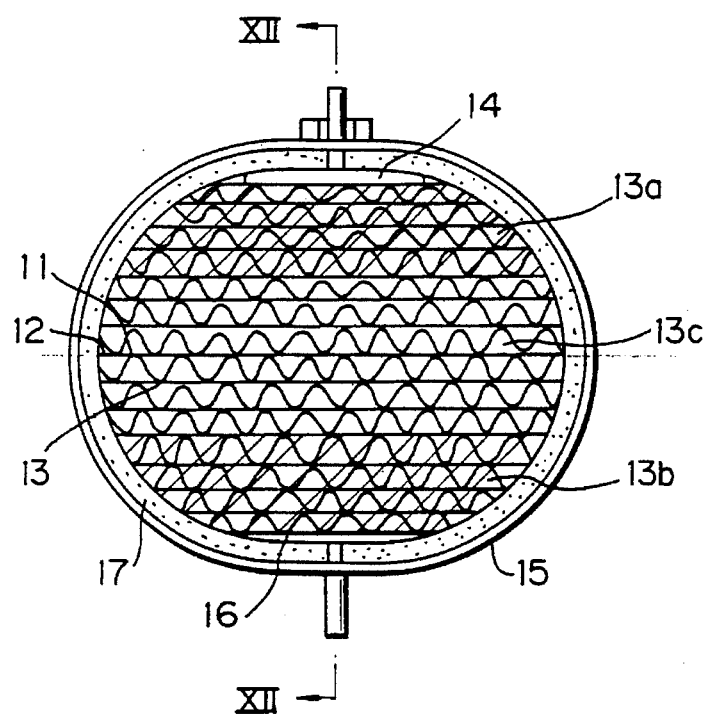
FIG. 11 is a view of the catalytic device of a fifth embodiment, shown in FIG. 12, seen along the arrow XI.
Figure 12:
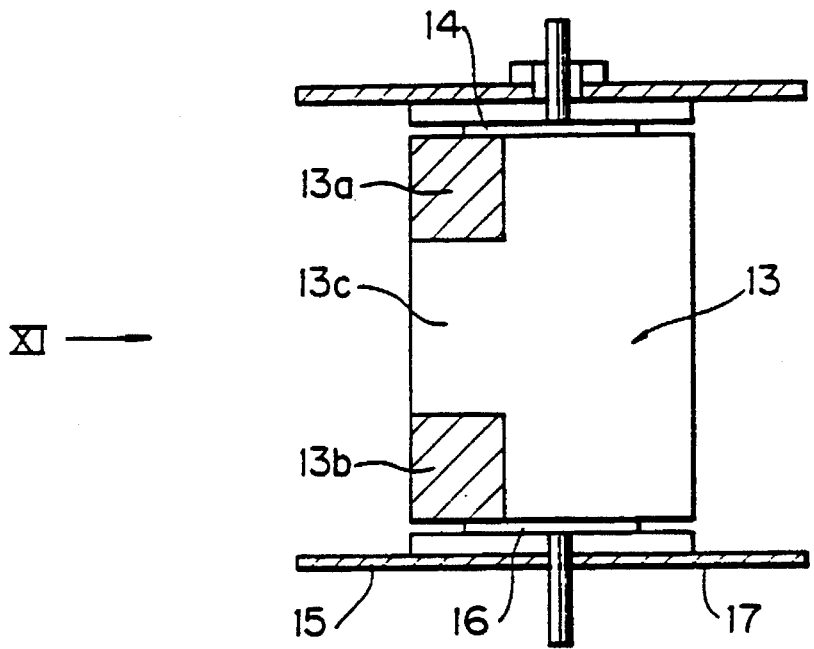
FIG. 12 is a cross-sectional view of the catalytic device taken along line XII—XII of FIG. 11.
Figure 13:
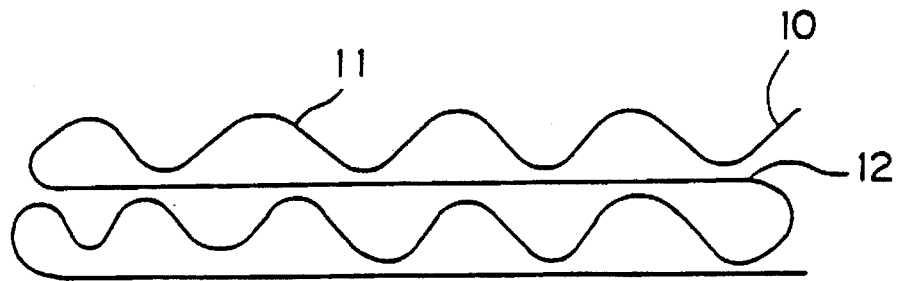
FIG. 13 is a view of the method of layering of the metallic catalyst carrier of the catalytic device of the embodiment of FIG. 11.

FIGS. 11 to 13 show the fifth embodiment. In this embodiment, one thin sheet 10 of the first embodiment is alternately formed into the corrugated sheet 11 and the flat sheet 12 as shown in FIG. 13 and is folded so that the corrugated sheet 11 and the flat sheet 12 lie on each other.

As shown in FIG. 11, the metallic catalyst carrier 13 is inserted into an elliptically shaped metallic case 15 within an insulating material 17. At the top portion and bottom portion of the catalyst carrier 13 electrodes 14 and 16 are connected. The top portion 13a and the bottom portion 13b of the catalyst carrier 13 are made the joined regions and the intermediate portion 13c is made the nonjoined region, that is, the heat generating portion.

Referring to FIG. 12, the joined regions 13a and 13b are formed only at the upstream side of the flow of the exhaust gas.

In this embodiment too, the same mode of operation and effects can be exhibited as in the first embodiment.

FIGS. 14 to 17 show a sixth and seventh embodiment differing from the fifth embodiment in the joined regions.

Figure 14:
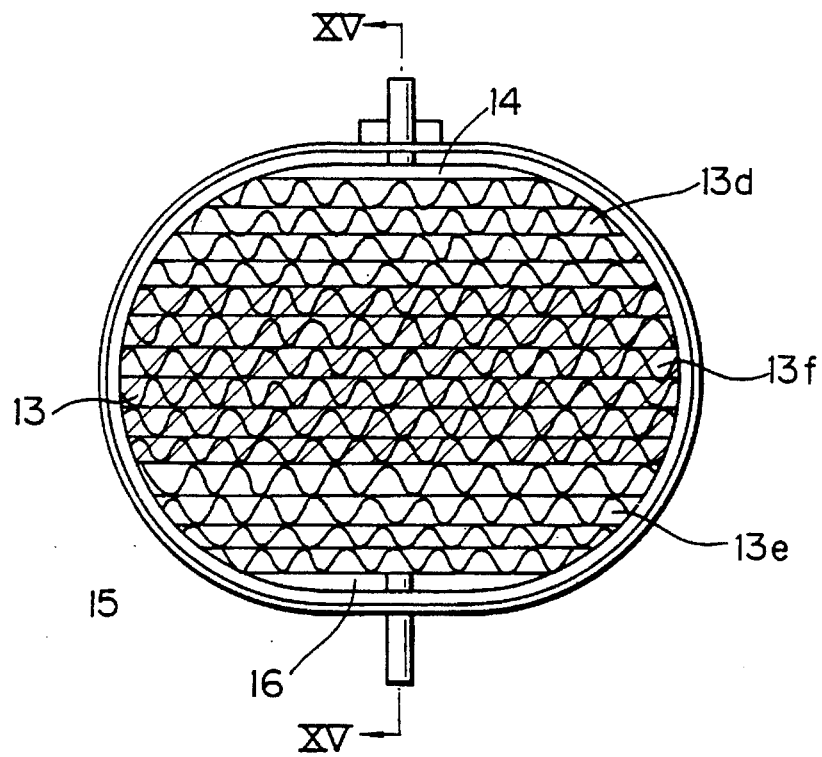
FIG. 14 is a view of the catalytic device of a sixth embodiment, shown in FIG. 15, seen along the arrow XIV.
Figure 15:
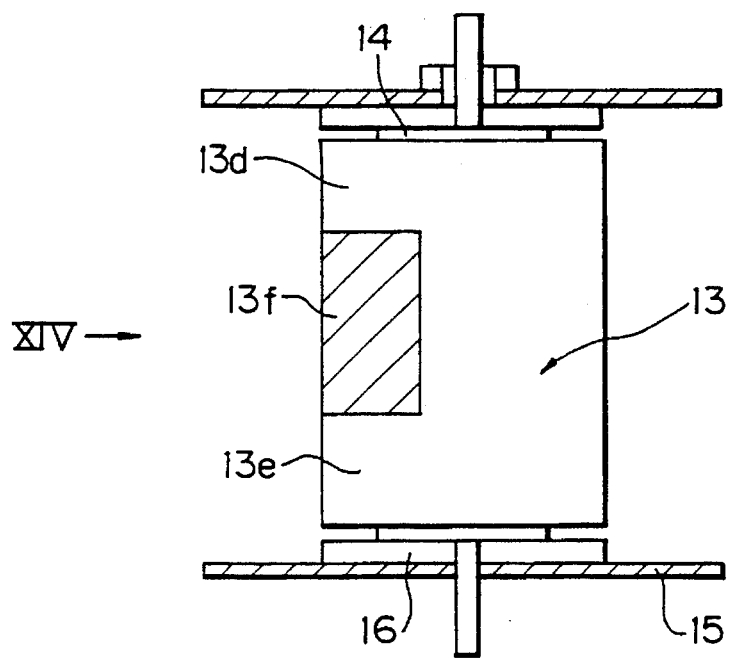
FIG. 15 is a cross-sectional view of the catalytic device taken along line XV—XV of FIG. 14.

In the sixth embodiment shown in FIGS. 14 and 15, conversely to the fifth embodiment, the top portion 13d and the bottom portion 13e are made the nonjoined regions and the intermediate portion 13f is made the joined region.

Figure 16:
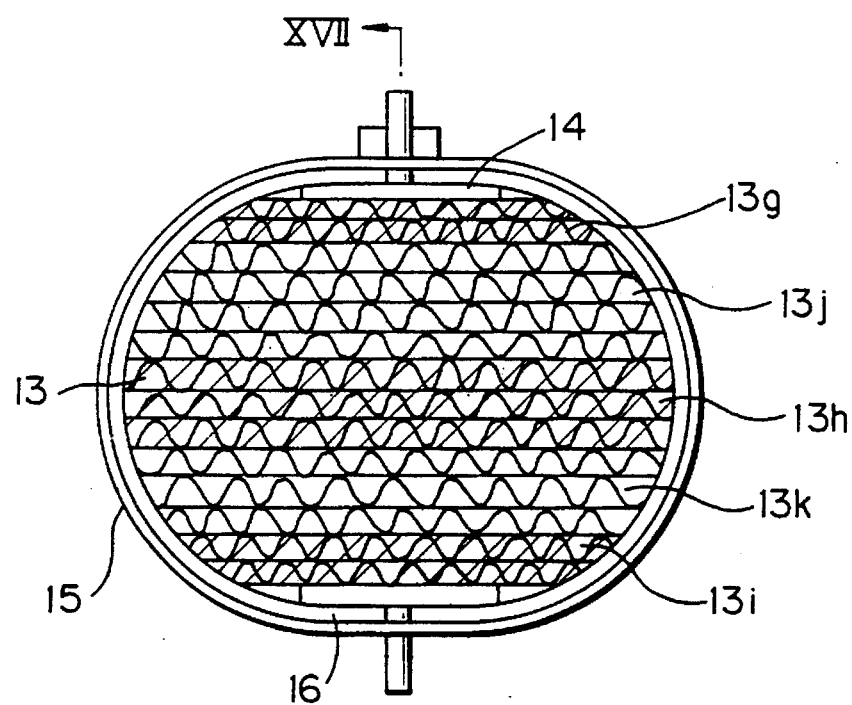
FIG. 16 is a view of the catalytic device of a seventh embodiment, shown in FIG. 17, seen along the arrow XVI.
Figure 17:
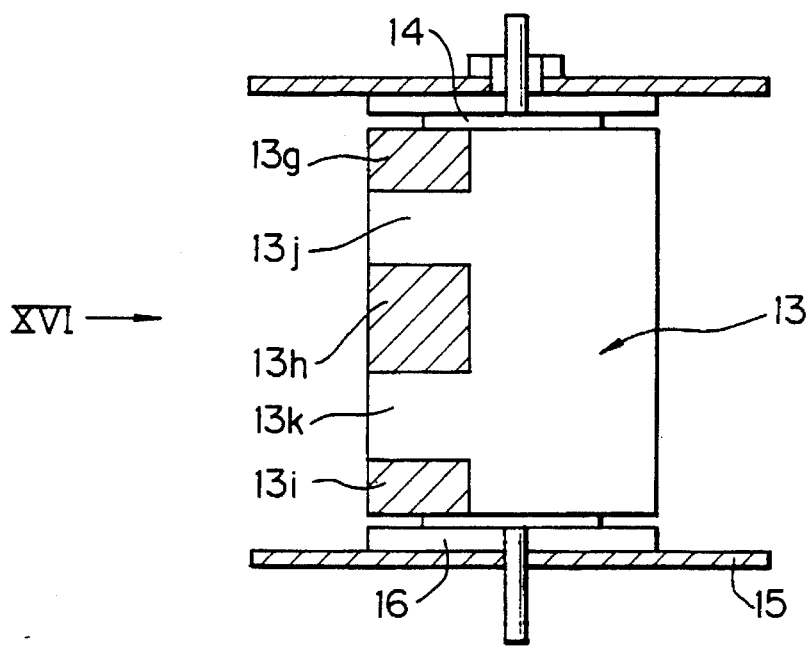
FIG. 17 is a cross-sectional view of the catalytic device taken along line XVII—XVII of FIG. 16.

In the seventh embodiment shown in FIGS. 16 and 17, joined regions 13g, 13h, and 13i and nonjoined regions 13j and 13k are alternately formed from the top down.

An explanation will now be made of the eighth embodiment referring to FIGS. 18 to 21. First, referring to FIG. 20, a thin metallic corrugated sheet 21 and flat sheet 22 are layered and wound together to form spiral-like alternate layers, thereby forming a honeycomb shaped metallic catalyst carrier 23. The corrugated sheet 21 and the flat sheet 22 are, for example, foil materials of a thickness of about 50 µm having a composition of 20 percent chromium, 5 percent aluminum, and 75 percent iron. The surfaces of the corrugated sheet 21 and flat sheet 22 in the nonjoined regions are coated with an insulating film of activated $Al_2O_3$. On the coating of the activated $Al_2O_3$ is carried the catalyst precious metal, for example, platinum, palladium, or rhodium.

Figure 18:
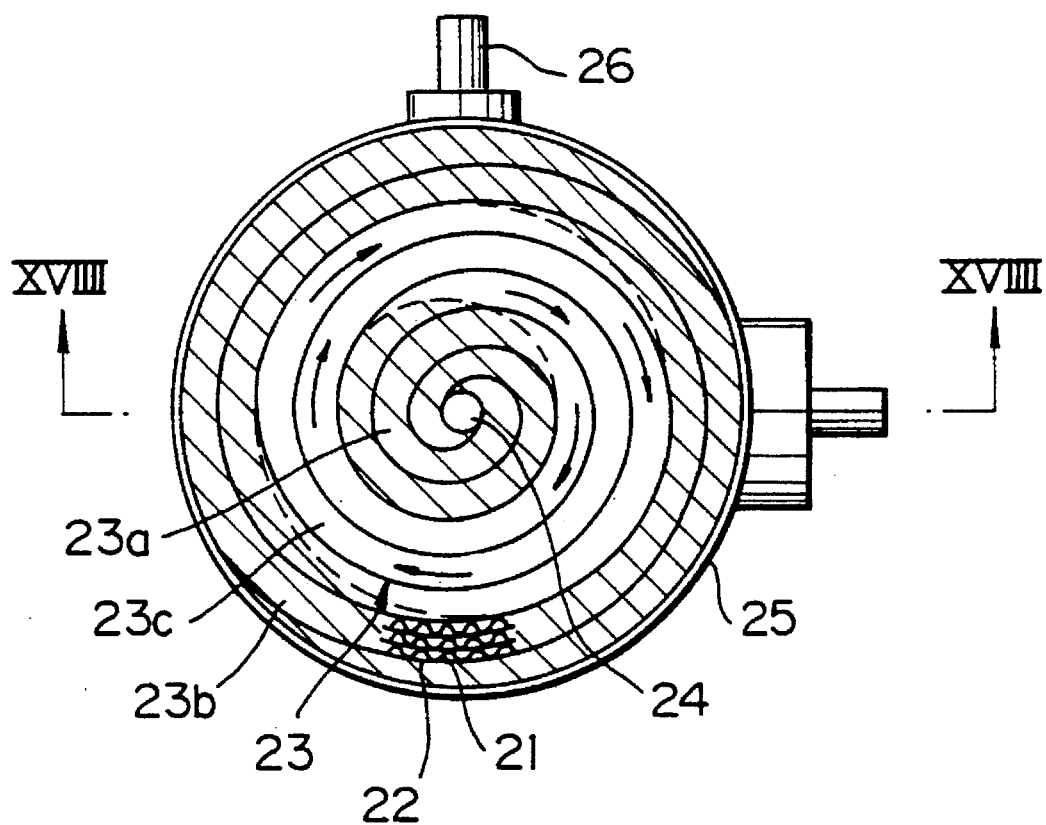
FIG. 18 is a view of the catalytic device of an eighth embodiment, shown in FIG. 19, seen along the arrow XVIII.
Figure 19:
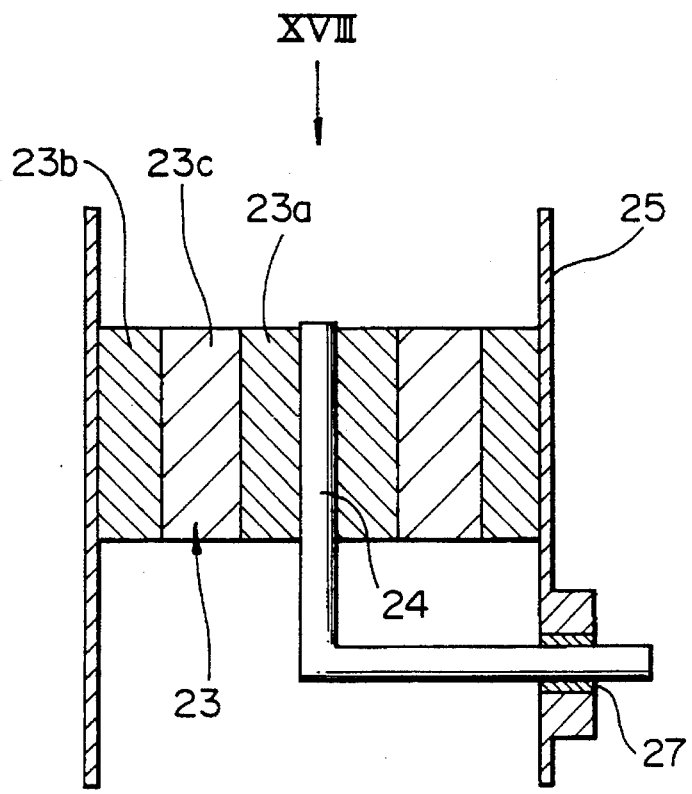
FIG. 19 is a cross-sectional view of the catalytic device taken along line XVIIII—XVIIII of FIG. 18.

Referring to FIGS. 18 and 19, the positive electrode 24 is disposed at the center of the catalyst carrier 23 along its axial direction. The positive electrode 24 is connected in a conductive fashion to the catalyst carrier 23. The catalyst carrier 23 is inserted into a metallic cylindrical case 25 and affixed to the case 25 by, for example, brazing. The catalyst carrier 23 is made conductive with the case 25. As shown in FIGS. 18, a negative electrode 26 is connected to the side of the case 25. As shown in FIG. 19, the positive electrode 24 extends in the axial direction of the case 25, then is bent in an L-shape and extends in the diametrical direction of the case 25 and passes through the side surface of the case 25. The positive electrode 24 is electrically insulated from the case 25 by the insulating material 27.

Referring to FIG. 18, in the cylindrical region 23a of the center of the catalyst carrier 23 and the cylindrical region 23b (hatched region in figure) at the outer periphery, the mountains and valleys of the corrugated sheet 21 are conductively joined to the flat sheet 22, for example, by brazing, electro-discharge welding, laser welding, etc. In the region 23c between the center joined region 23a and the outer peripheral joined region 23b, the corrugated sheet 21 and the flat sheet 22 are not joined and therefore the corrugated sheet 21 and the flat sheet 22 are insulated by the insulating film $Al_2O_3$. The center joined region 23a, the outer peripheral joined region 23b, and the nonjoined region 23c are substantially equal to each other in the length in the diametrical direction.

Referring to FIG. 19, the joined regions 23a and 23b and the nonjoined region 23c are formed across the entire length of the catalyst carrier 23 in the axial direction.

Note that the joined regions may also be formed only at the upstream side of the flow of exhaust gas or may be formed at both the upstream side end and downstream side end of the same.

In each of the regions of the nonjoined region 23c and the joined region 23a and 23b, the catalyst is carried so as to given a uniform amount of catalyst precious metal per unit area. The amount of catalyst precious metal per unit area in the nonjoined region 23c can be increased over the amount of the catalyst precious metal per unit area at the joined regions 23a and 23b. The larger the amount of catalyst precious metal per unit area, the lower the temperature at which the catalyst begins to purify the exhaust gas, that is, the catalyst activation temperature, so in the nonjoined region 23c, the catalyst activation temperature may be reduced compared with that of the joined regions 23a and 23b.

Figure 20:
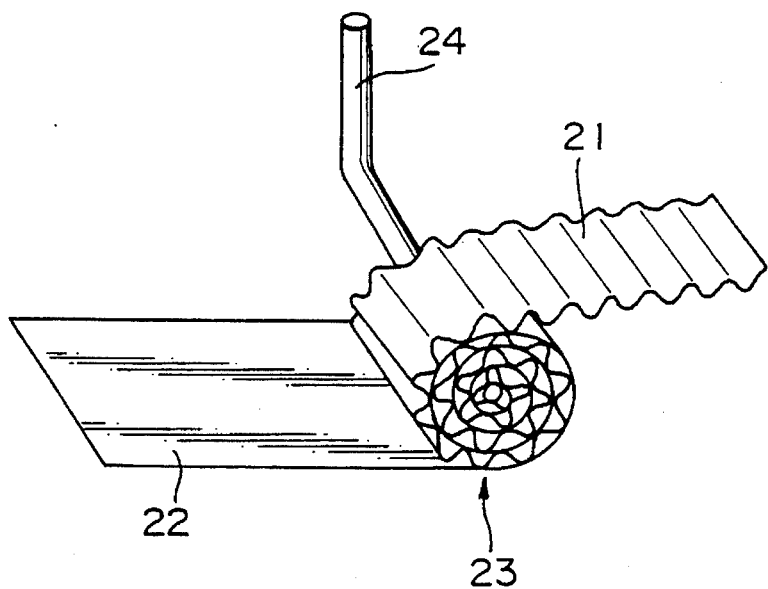
FIG. 20 is a view of the formation of a catalyst carrier by layering and winding a corrugated sheet and flat sheet.

The conduction heating type catalytic device shown from FIGS. 18 to 20 is disposed in the exhaust passage of an internal combustion engine and the main catalytic device is disposed in the exhaust passage downstream of this conduction heating type catalytic device.

Since the corrugated sheet 21 and the flat sheet 22 are connected conductively at the center joined region 23a and the outer peripheral joined region 23b, the electrical resistance is low and therefore almost no heat is generated. On the other hand, at the nonjoined region 23c, since the corrugated sheet 21 and the flat sheet 22 are insulated from each other, the current path is formed long in length in a spiral shape along the corrugated sheet 21 and the flat sheet 22 as shown by the arrow in FIG. 18, so the electrical resistance becomes larger. Therefore, the nonjoined region 23c generates heat upon being run through with current and serves as a heat generating portion.

Therefore, when voltage is applied, the nonjoined region 23c generates heat and quickly reaches the catalyst activation temperature where it can purify the harmful substances in the exhaust gas. In particular, in this embodiment, as mentioned earlier, since the catalyst activation temperature of the nonjoined region is reduced, the catalyst is activated in a shorter time compared with the prior art, as shown in FIG. 21.

Figure 21:
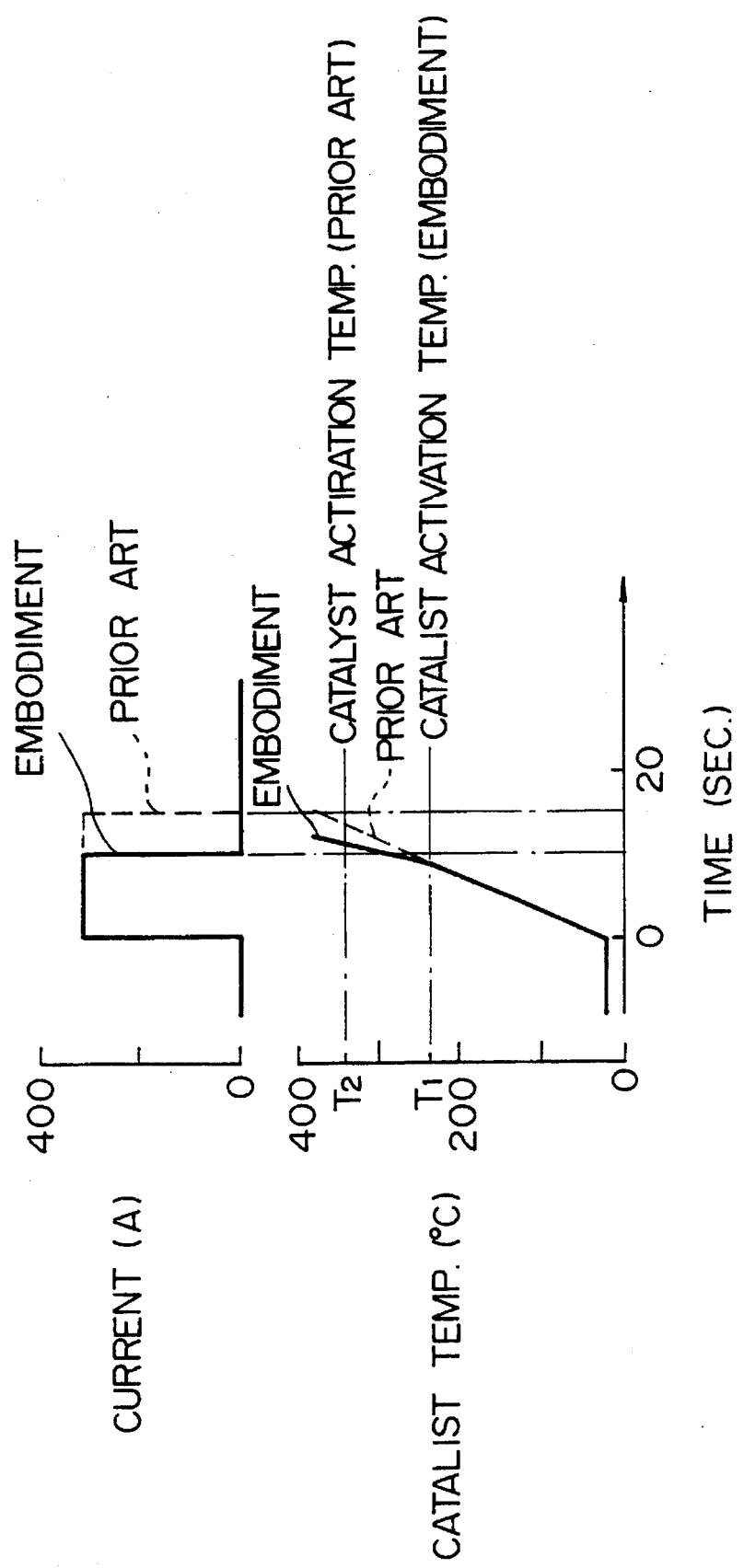
FIG. 21 is a graph of the relationship between the conduction time and the catalyst temperature.

That is, referring to FIG. 21, the catalyst activation temperature $T_1$ of the embodiment is about 100° C. lower than the conventional catalyst activation temperature $T_2$ and therefore in this embodiment it is possible to shorten the time required from the start of conduction to reaching the catalyst activation temperature.

When it reaches the catalyst activation temperature and the purification of the harmful substances in the exhaust gas is started, the regions other than the nonjoined region 23c also rise in temperature due to the catalytic reaction heat. Moreover, when the catalytic reaction of the electrically heating catalytic device progresses, the main catalytic converter can also be heated by the catalytic reaction heat of the same.

As explained above, according to this embodiment, since the catalyst activation temperature can be reduced in the nonjoined region 23c, it is possible to shorten the time for the nonjoined region 23c to rise to the catalyst activation temperature and thereby possible to purify the exhaust gas earlier.

Also, as shown in FIG. 21, since the catalyst activation temperature is reached by a short period of conduction of the catalyst carrier, it is possible to reduce the amount of power required for heating the catalyst carrier.

Further, the amount of catalyst precious metal per unit area is increased in just the nonjoined region and is not increased in the joined region, so the overall amount of the catalyst carried is not increased by a large amount and thus it is possible to prevent a major increase in the costs.

Moreover, the catalyst carrier 23 is joined at the joined regions 23a and 23b, so even if the catalyst carrier 23 is exposed to high temperature exhaust gas, there is no deviation in the catalyst carrier 23 in the axial direction and it is possible to improve the strength of the catalyst carrier 23.

FIGS. 22 to 27 show the ninth to 11th embodiments which differ in the joined regions.

In all of the following embodiments, the amount of the catalyst precious metal per unit area in the nonjoined region is increased over the amount of the catalyst carried per unit area in the joined region.

Figure 22:
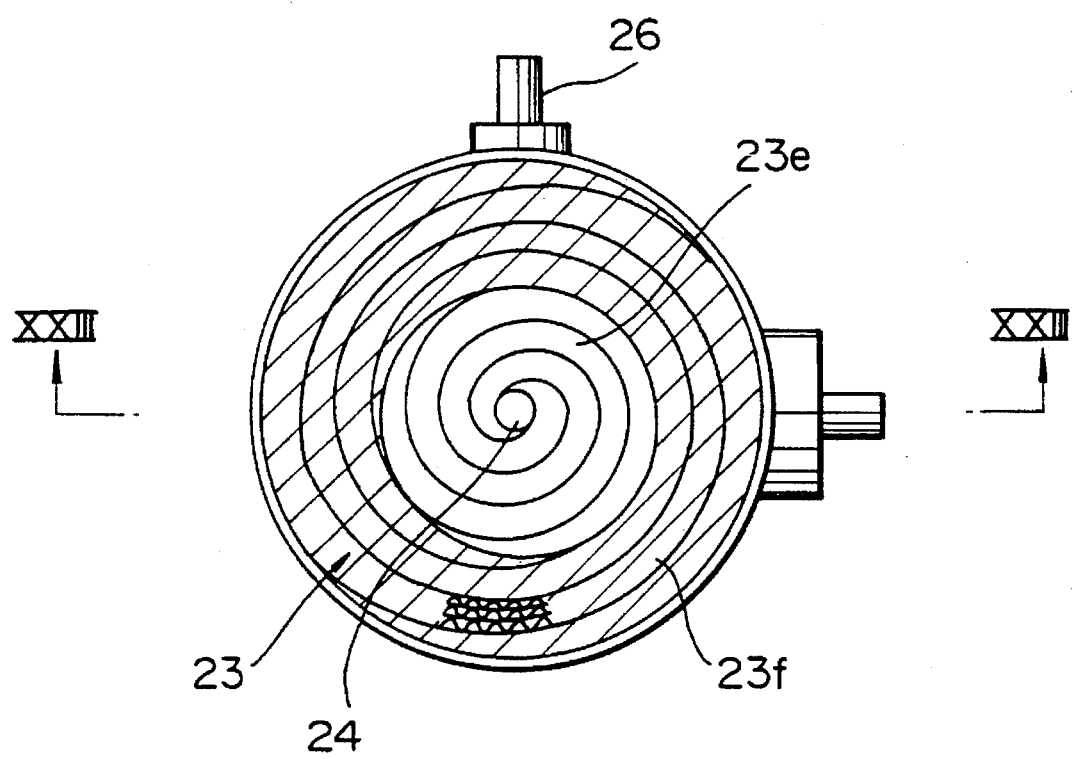
FIG. 22 is a view of the catalytic device of a ninth embodiment, shown in FIG. 23, seen along the arrow XXII.
Figure 23:
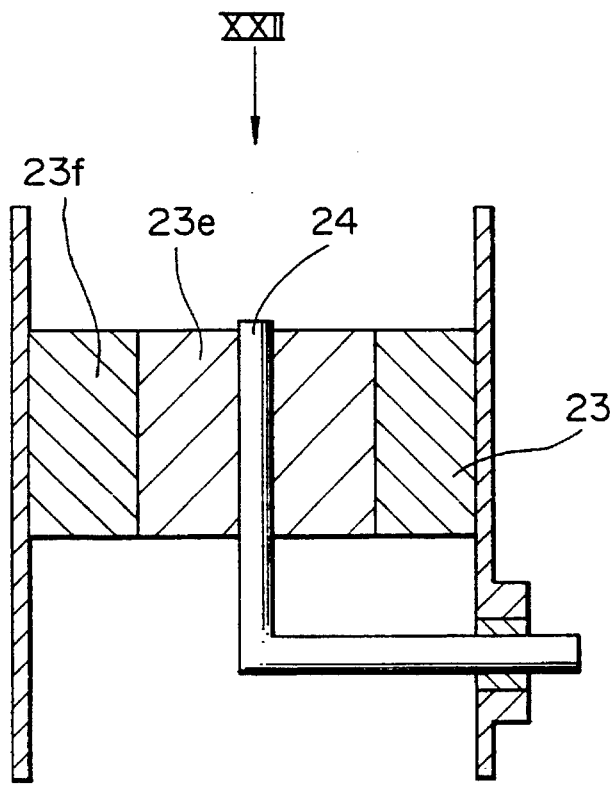
FIG. 23 is a cross-sectional view of the catalytic device taken along line XXIII—XXIII of FIG. 22.

In the ninth embodiment shown in FIGS. 22 to 23, the inner peripheral portion 23e is made the nonjoined region and the outer peripheral portion 23f is made the joined region. The nonjoined region 23e and the joined region 23f are substantially equal to each other in length in the diametrical direction.

The distribution of the flow of the exhaust gas is higher the closer to the center axis of the catalyst carrier 23 and in this embodiment the center portion of the catalyst carrier 23 is the heat generating portion, so the exhaust gas can be effectively purified.

Figure 24:
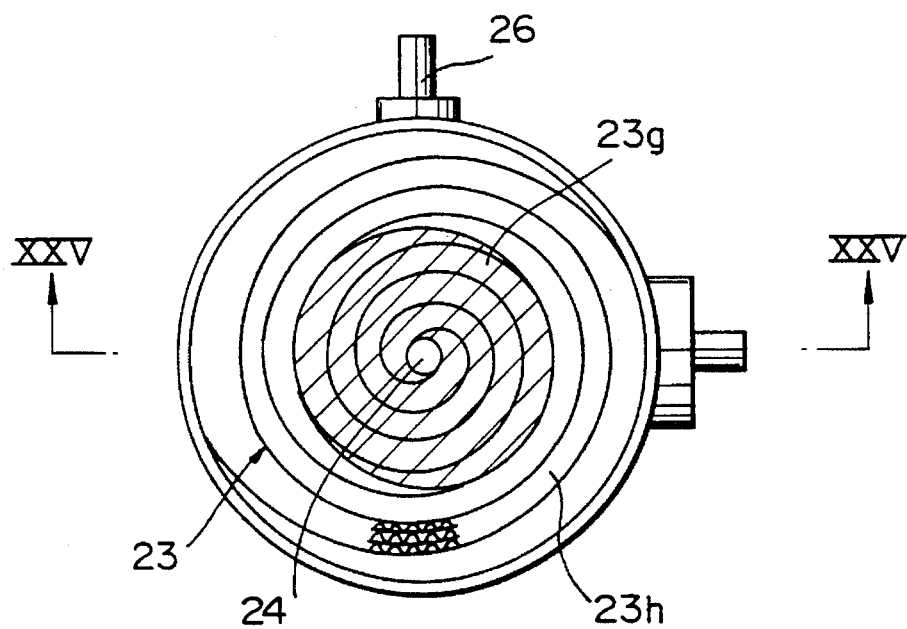
FIG. 24 is a view of the catalytic device of a 10th embodiment, shown in FIG. 25, seen along the arrow XXIV.
Figure 25:
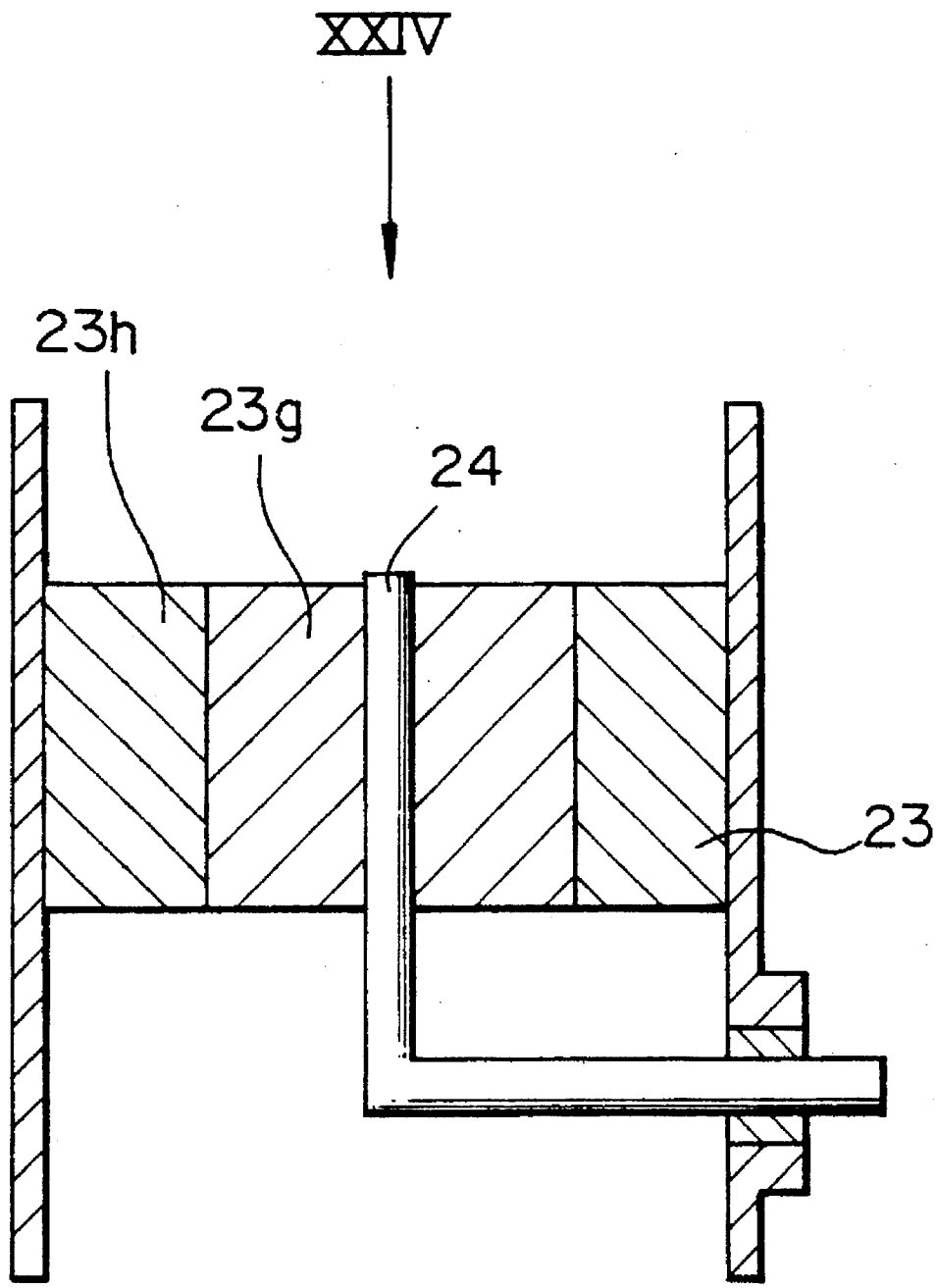
FIG. 25 is a cross-sectional view of the catalytic device taken along line XXV—XV of FIG. 24.

In the 10th embodiment shown in FIGS. 24 and 25, conversely to the ninth embodiment, the inner peripheral portion 23g is made the joined region and the outer peripheral portion 23h is made the nonjoined region.

Figure 26:
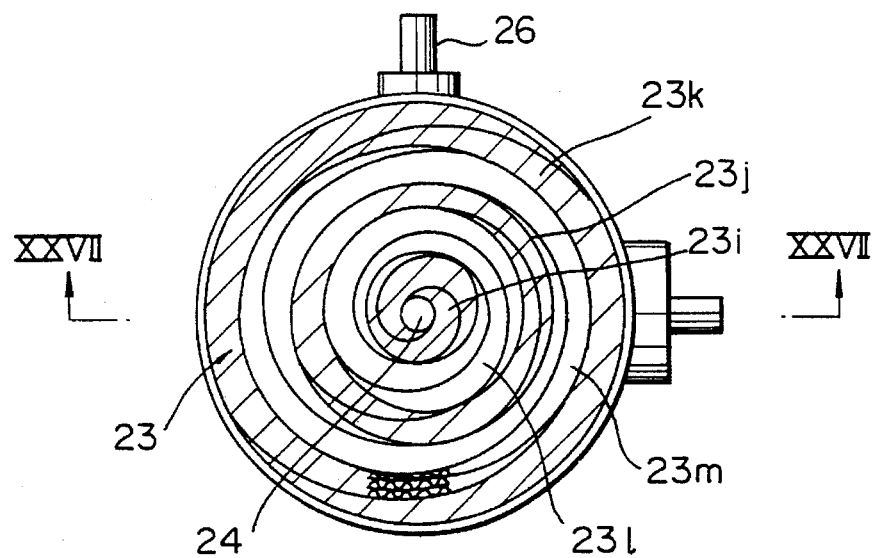
FIG. 26 is a view of the catalytic device of an 11th embodiment, shown in FIG. 27, seen along the arrow XXVI.
Figure 27:
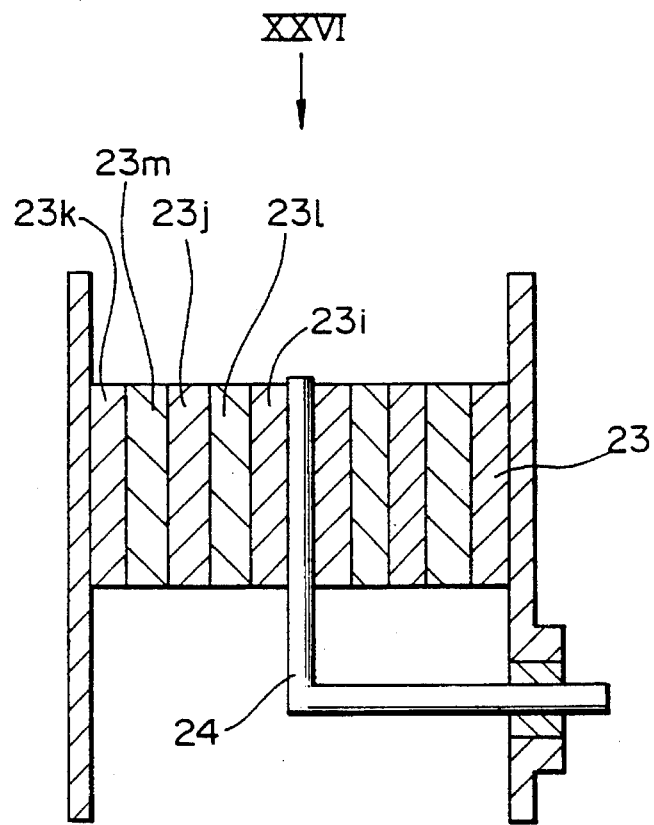
FIG. 27 is a cross-sectional view of the catalytic device taken along line XXVII—XXVII of FIG. 26.

In the 11th embodiment shown in FIGS. 26 and 27, annular shaped joined regions 23i, 23j, and 23k and annular shaped nonjoined regions 23l and 23m are alternately formed, the lengths of which in the radial direction are equal.

Figure 28:
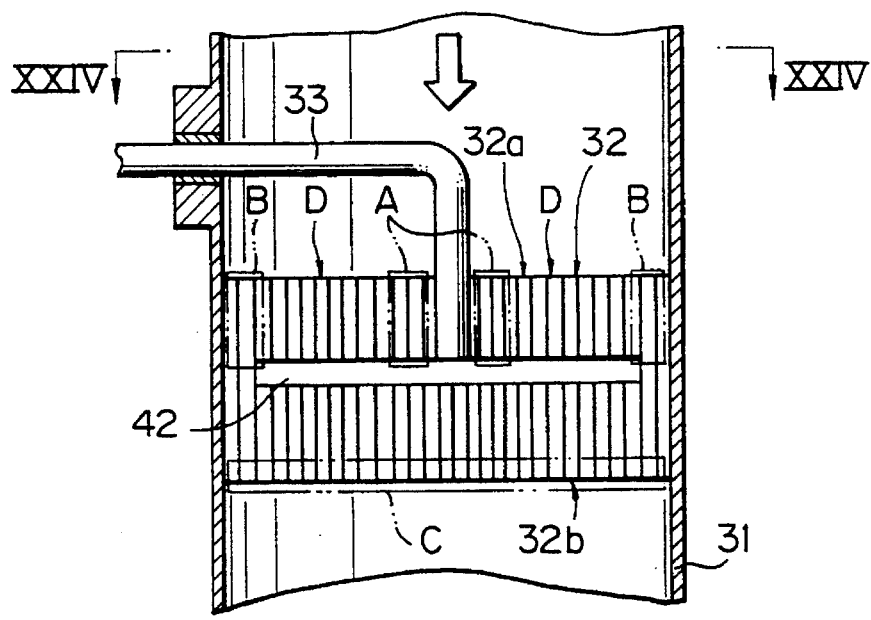
FIG. 28 is a side cross-sectional view of a 12th embodiment of a catalytic converter.
Figure 29:
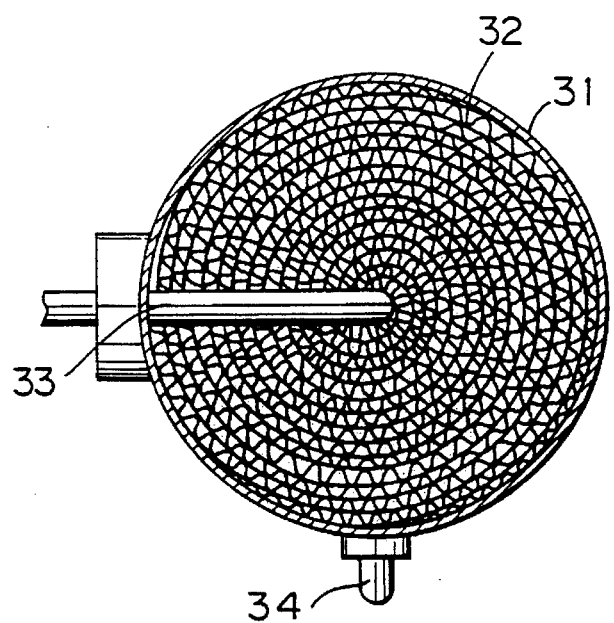
FIG. 29 is a cross-sectional view taken along line XXIX—XXIX of FIG. 28.

Next, an explanation will be made of a 12th embodiment. Referring to FIGS. 28 and 29, reference numeral 31 is a catalyst converter case, 32 is a core mounted in the case 31, 33 is a positive electrode forming an L-shape, and 34 is a negative electrode attached to the case 31. The exhaust gas flows in the case 31 in the direction of the arrow shown in FIG. 28. As shown in FIG. 29, the core 32 has a honeycomb shaped sectional shape and purifies the harmful components in the exhaust gas while the exhaust gas flows in the core 32.

Next, an explanation will be made of the process of production of the core 32 so as to facilitate understanding of the structure of the core 32.

Figure 30:
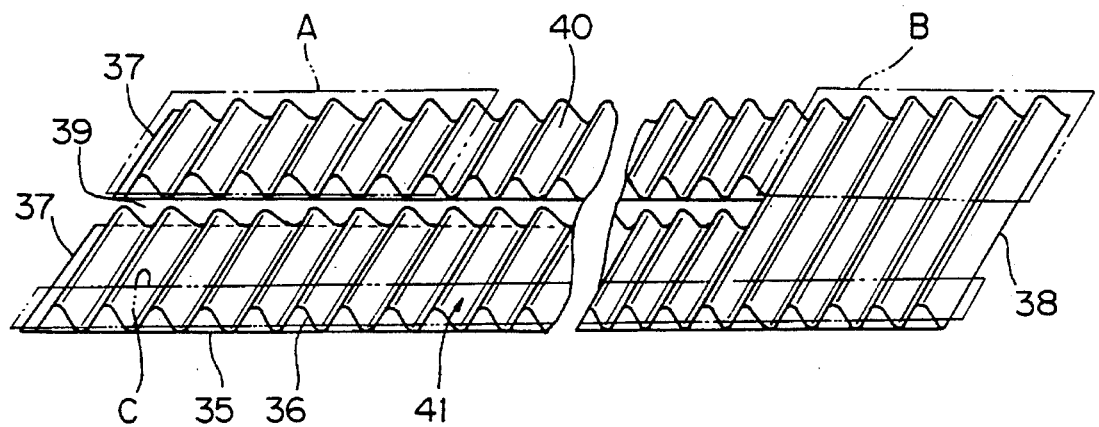
FIG. 30 is a perspective view of the flat sheet and corrugated sheet.

When manufacturing the core 32, first, a strip-like flat sheet 35 (foil) and a strip-like corrugated sheet 26 (foil) as shown in FIG. 30 are prepared. These flat sheet 35 and corrugated sheet 36 are formed from a heat resistant alloy including aluminum. FIG. 30 shows the flat sheet 35 and the corrugated sheet 36 laid upon each other. As shown in FIG. 30, the flat sheet 35 and the corrugated sheet 36 have slits 39 extending in parallel to the longitudinal axis of the sheets 35 and 36 from one end 37 to near the other end 38 and are divided into a first foil portion 40 and a second foil portion 41 at the line running along the slits 39.

First, the ends 37 of the flat sheet 35 and the corrugated sheet 36 of the first foil portion 40 are welded to the electrode 33 shown in FIG. 28. Next, a thin film made of a soldering material is inserted on the corrugated sheet 36 in the regions A, B, and C surrounded by broken lines in FIG. 30 and between the flat sheet 35 and the corrugated sheet 36. That is, the regions where the thin sheet of soldering material is inserted are the region A within a certain distance from the end 37 of the first foil portion 40, the region B within a certain distance from the end 38 of the first foil portion 40, and the region C alone the entire edge portion of the second foil portion 41 positioned at the opposite side to the first foil portion 40. Next, the flat sheet 35 and the corrugated sheet 36 of the first foil portion 40 are wound in a spiral manner around the electrode 33 in the state laid on each other as shown in FIG. 30. At this time, the flat sheet 35 and the corrugated sheet 36 of the second foil portion 40 are wound in a spiral form around the end edge 37 of the second foil portion 40.

When the flat sheet 35 and the corrugated sheet 36 are wound in a spiral manner in this way, a first core portion 32a (FIG. 28) is formed by the first foil portion 40 and a second core portion 32b (FIG. 28) is formed by the second foil portion 41. At this time, a space 42 is formed between the center portion of the first core portion 32a and the center portion of the second core portion 32b by the slits 39 provided between the first foil portion 40 and the second foil portion 41. Therefore, in the embodiment shown in FIG. 28 and FIG. 29, the first core portion 32a and the second core portion 32b are integrally connected at the peripheral edge in the radial direction but are separated by a certain distance at the center in the axial direction of the core 32.

Next, the first core portion 32a and the second core portion 32b are heated in an inert gas. At that time, the thin film of the soldering material melts and as a result the tips of the corrugations of the corrugated sheet 36 in the regions A, B, and C shown in FIG. 30 and the portions of the flat sheet 35 facing the tips are joined together. The region A shown in FIG. 30 corresponds to the center region A of the first core portion 32a shown in FIG. 28, the region B shown in FIG. 30 corresponds to the peripheral side region B of the first core portion 32a shown in FIG. 28, and the region C shown in FIG. 30 corresponds to the axial direction end region C of the second core portion 32 shown in FIG. 28. Therefore, at the center region A and the peripheral side region B of the first core portion 32a and the axial direction end region C of the second core portion 32b shown in FIGS. 28, the tips of the corrugations of the corrugated sheet 36 are joined to the facing portions of the flat sheet 35.

Next, the first core portion 32a and the second core portion 32b are heated in an oxidizing atmosphere. At this time, alumina forms on the entire surface of the flat sheet 35 and the corrugated sheet 36 except the portions where the solder is attached and as a result, an alumina layer, which is a poor electrical conductor, covers the entire surface of the flat sheet 35 and the corrugated sheet 36 except where the solder is attached. Note that instead of doing this, it is also possible to form a poorly electrically conductive alumina layer on the surface of the flat sheet 35 in the regions other than the regions A, B, and C by heating just the flat sheet 35 in the regions other than the regions A, B, and C of FIG. 30 in the oxidizing atmosphere, then inserting a thin film made of a soldering material between the flat sheet 35 and the corrugated sheet 36 in the regions A, B, and C and joining the flat sheet 35 and the corrugated sheet 36 by the same. Next, activated alumina is coated on the alumina surface and the catalyst metal is carried on the activated alumina. In this way, a core 32 of a sectional honeycomb structure comprised of a first core portion 32a and the second core portion 32b is formed. This core 32 is inserted into the case 31 as shown in FIG. 29 and the outer edges of the flat sheet 35 and the corrugated sheet 36 are joined to the inner wall surface of the casting 31.

When voltage is applied across the pair of electrodes 33 and 34, current flows from the electrode 33 toward the case 31. At this time, since the tips of the corrugations of the corrugated sheet 36 and the flat sheet 35 are joined at the center region A and the peripheral side region B of the first core portion 32a, the current flows in the first core portion 32a in substantially the radial direction and therefore the electrical resistance in the center region A and the peripheral side region B becomes extremely low. Thus, almost no heat is generated at the center region A and the peripheral side region B.

As opposed to this, since the entire surface of the flat sheet 35 and the corrugated sheet 36 in the intermediate region D between the center region A and the peripheral side region B of the first core portion 32a is covered by an alumina layer which is a poor electrical conductor, the current flows in a spiral direction through the flat sheet 35 and the corrugated sheet foil 36. As a result, the electrical resistance of the intermediate region D becomes larger, so the intermediate region D generates heat. That is, the first core portion 32a generates heat partially at just the intermediate region D.

On the other hand, the first core portion 32a of the region B is connected integrally to the second core portion 32b, but the electrical resistance in the region B is small, so current flows in almost the entire region B and therefore almost no current flows in the second core portion 32b. Therefore, the second core portion 32b is made to generate heat electrically.

When voltage is applied across the pair of electrodes 33 and 34, the intermediate region D of the first core portion 32a generates heat, and the temperature of the intermediate region D reaches from 300° C. to 400° C., an oxidation reaction of the unburnt HC, CO, etc. in the exhaust gas starts. The oxidation reaction is an exothermic reaction, therefore once the oxidation reaction is started, the heat of the oxidation reaction causes the center region A and peripheral side region B of the first core portion 32a and the second core portion 32b to immediately rise from 300° C. to 400° C. As a result, the first core portion 32a and the second core portion 32b as a whole perform the catalytic action and therefore the purification action of the exhaust gas is performed by the core 32 as a whole.

When the core 32 as a whole is electrically heated, considerable power would be needed. However, in the embodiment shown in FIGS. 28 and 29, only part of the core 32, that is, only the intermediate region D of the first core portion 32a, is actually heated, so it is possible to reduce the amount of electrical power consumed. Further, even if only a part of the core 32 is heated in this way, once the oxidation reaction starts, the heat of the oxidation reaction heats the remaining portions of the core 32, so in the end it is possible to quickly raise the temperature of the core 32 as a whole.

Also, at the intermediate region D of the first core portion 32a, relative movement between the flat sheet 35 and the corrugated sheet 36 is possible, so even if a rapid heating and rapid cooling cycle is repeated, the thermal stress caused due to the same is absorbed by the intermediate region D and therefore it is possible to improve the durability of the core 32 as a whole.

Further, in the embodiment shown in FIGS. 28 and 29, the first core portion 32a to be electrically heated and the second core portion 32b not electrically heated are formed integrally from a single flat sheet 35 and single corrugated sheet 36. Therefore, not only is the manufacture of the core 32 easy, but also the attachment of the core 32 to the case 31 is extremely easy. Note that it is possible to prevent the center portion of the second core portion 32b from projecting out in the axial direction of the core 32 by joining the flat sheet 35 and the corrugated sheet 36 at the axial direction end region C of the second core portion 32b, but to give flexibility to the second core portion 32b and absorb the thermal stress, the flat sheet 35 and the corrugated sheet 36 may be joined at only part of the axial direction end region of the second core portion 32b.

Further, when the electrically heated first core portion 32a is disposed at the upstream side of the direction of flow of the exhaust gas as shown in FIG. 28 and not electrically heated second core portion 32b is disposed at the downstream side, when the oxidation reaction begins at the first core portion 32a, the heat of the oxidation reaction is conveyed by the exhaust gas so the second core portion 32b is immediately heated. Therefore, seen from the viewpoint of the quick heating of the second core portion 32b, it is preferable to dispose the second core portion 32b at the downstream side of the first core portion 32a.

Figure 31:
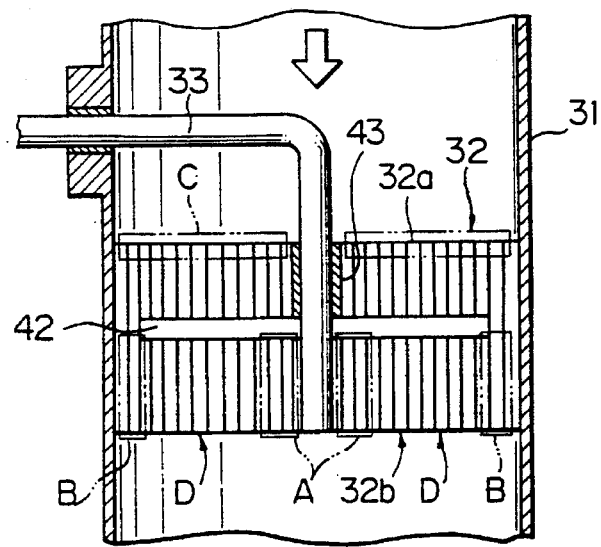
FIG. 31 is a side cross-sectional view of a 13th embodiment of a catalytic converter.
Figure 32:
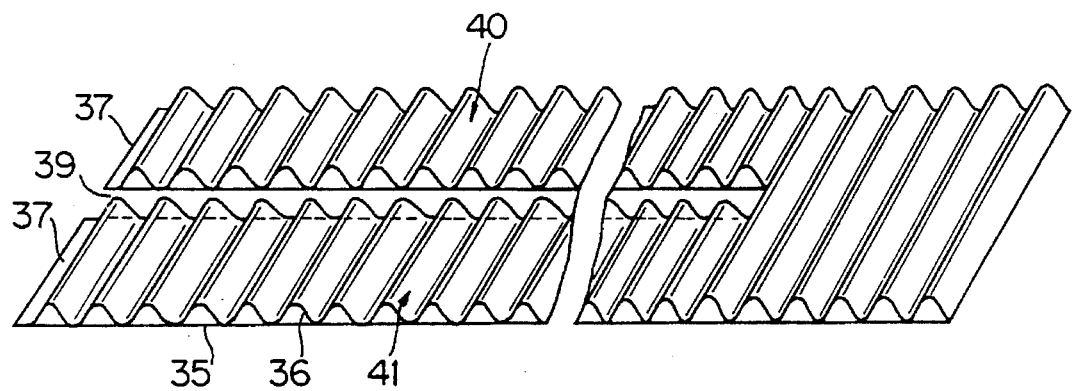
FIG. 32 is a perspective view of the flat sheet and corrugated sheet used in the catalytic converter shown in FIG. 31.

FIGS. 31 and 32 show a 13th embodiment. Note that in this embodiment, constituent elements the same as those in FIGS. 28 to 30 are given the same reference numerals.

Referring to FIG. 32, in this embodiment, use is made of a pair of flat sheet 35 and corrugated sheet 36 having slits 39 similar to those in FIG. 30. Therefore, when the flat sheet 35 and the corrugated sheet 36 are wound in a spiral fashion, as shown in FIG. 31, a space 42 is formed between the center portion of the first core portion 32a and the center portion of the second core portion 32b. Further, in this embodiment, the end edge 37 of the first foil portion 40 is affixed to the electrode 33 by the adhesive 43 comprised of an electrically insulating material, while the end edge 37 of the second foil portion 41 is joined to the electrode 33. Further, in this embodiment, in the center region A and peripheral side region B of the second core portion 32b and the axial direction end region C of the first core portion 32a, the tips of the corrugations of the corrugated sheet 36 and the flat sheet 35 are fused together. In this embodiment, the intermediate region D of the second core portion 32b is electrically heated.

Figure 33:
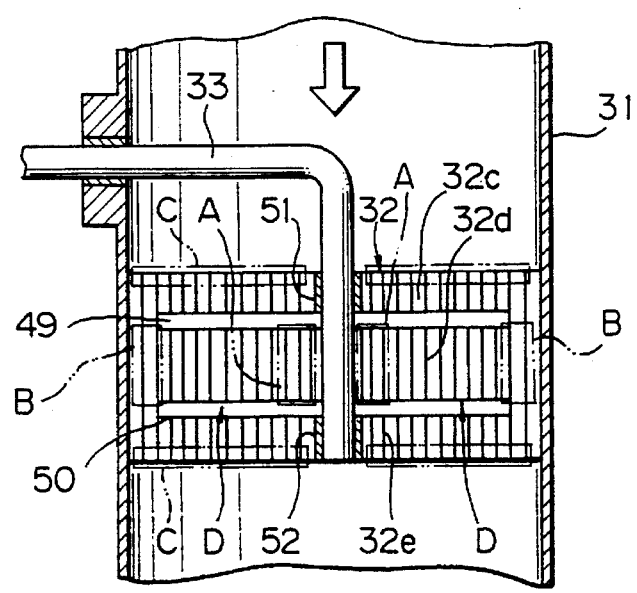
FIG. 33 is a side cross-sectional view of a 14th embodiment of the catalytic converter.
Figure 34:
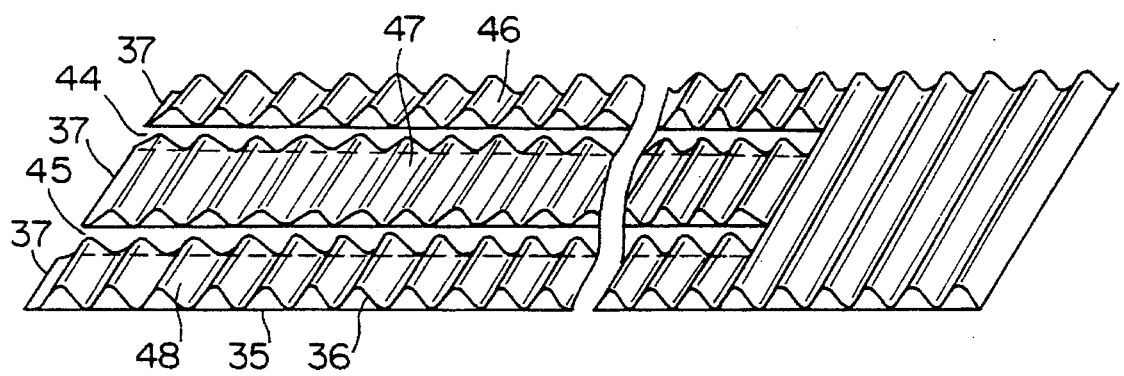
FIG. 34 is a perspective view of a flat sheet and corrugated sheet used in the catalytic converter shown in FIG. 33.

FIGS. 33 and 34 show a 14th embodiment. Note that in this embodiment, constituent elements similar to those of FIGS. 28 to 30 are given the same reference numerals.

Referring to FIG. 34, in this embodiment, a pair of slits 44 and 45 are formed extending in parallel with the longitudinal axis of the sheets 35 and 36 from the end edge 37 of the sheets 35 and 36 to near the end edge 38. The flat sheet 35 and the corrugated sheet 36 are divided into three portions, that is, the first foil portion 46, the second foil portion 47, and the third foil portion 48, by the lines extending along the slits 44 and 45. Therefore, when the flat sheet 35 and corrugated sheet 36 are wound in a spiral shape, a first core portion 32c is formed by the first foil portion 46, a second core portion 32d is formed by the second foil portion 47, a third core portion 32e is formed by the third foil portion 48, a space 49 is formed between the center portion of the first core portion 32c and the center portion of the second core portion 32d, and a space 50 is formed between the center portion of the second core portion 32d and the center portion of the third core portion 32e. Further, the peripheral edges of the first core portion 32c, the second core portion 32d, and the third core portion 32e are integrally connected to each other.

Further, in this embodiment, the end edges 37 of the first foil portion 46 and the third foil portion 48 are electrically affixed by an adhesive 51 and 52 comprised of an electrically insulating material, while the end edge 37 of the second foil portion 47 is welded to the electrode 33. Further, in this embodiment, at the center region A and peripheral side region B of the second core portion 32 and the axial direction end regions C of the first core portion 32c and third core portion 32e, the tips of the corrugations of the corrugated sheet 36 and the flat sheet 35 are welded together. In this embodiment, the intermediate portion D of the second core portion 32d is electrically heated.

Although the invention has been described with reference to specific embodiments chosen for purposes of illustration, it should be apparent that numerous modifications can be made thereto without departing from the basic concept and scope of the invention.

We claim:

1. An electrically heated catalytic device having a honeycomb shaped metallic catalyst carrier, said electrically heated catalytic device comprising:
   a layer of adjoining metallic foils including a corrugated foil and a metallic flat foil, said layer extending along a path from a first electrode to a second electrode and having a width extending in a direction substantially perpendicular to the path, said layer including,
   i) first sections; and
   ii) second sections each extending for predetermined distances along the path and extending across the entire width of said layer;
   b) conductive joints existing between adjoining metallic foils in said first sections; and
   c) non-conductive points existing between adjoining metallic foils in said second sections; wherein the surfaces of said layers are coated with an insulation film except in the areas of contact of the first sections where the adjoining metallic foils contact one another.

2. The catalytic device according to claim 1, wherein the metallic catalyst carrier is formed by winding at least one metallic flat foil and at least one metallic corrugated foil about an axis of the catalytic device in a spiral shape so that a metallic flat foil is located between each two adjacent metallic corrugated foils.

3. The catalytic device according to claim 2, wherein the first electrode is located in a central region of the metallic catalyst carrier and the second electrode is located in an outer region of the metallic catalyst carrier.

4. The catalytic device according to claim 3, wherein the first sections are located within the central cylindrical region of the metallic catalyst carrier and within the peripheral cylindrical region of the metallic catalyst carrier and wherein the second sections are located only in an intermediate cylindrical region of the metallic catalyst carrier, the intermediate cylindrical region being located between the central cylindrical region and the peripheral cylindrical region.

5. The catalytic device according to claim 3, wherein the first sections include a peripheral cylindrical region of the metallic catalyst carrier and wherein the second sections include all regions of the metallic catalyst carrier other than the peripheral cylindrical region.

6. The catalytic device according to claim 3, wherein the first sections include a central cylindrical region of the metallic catalyst carrier and wherein the second sections all regions of the metallic catalyst carrier other than the central cylindrical region.

7. The catalytic device according to claim 3, wherein the first sections are cylindrical and the second sections are cylindrical, and wherein the first and second sections are alternately formed concentrically about the central region of the metallic catalyst carrier.

8. The catalytic device according to claim 3, wherein the metallic catalyst carrier includes a plurality of cores, each core including a central region and a peripheral region, wherein each core includes a first area which is integrally connected to an adjacent core and a second area which is separated from adjacent cores by a predetermined distance in the axial direction of the metallic catalyst carrier, and wherein a current is passed between the central region and the peripheral region of at least one core.

9. The catalytic device according to claim 8, wherein the metallic catalyst carrier includes an upstream end and a downstream end such that exhaust gas flowing through the device passes from the upstream end to the downstream end, and wherein a peripheral region of each core is integrally connected to a peripheral region of an adjacent core.

10. The catalytic device according to claim 9, wherein a first core is disposed upstream of a second core, an electrode is conductively joined to the central region of the first core, the first sections including at least a part of the central region of the first core and at left a part of the peripheral region of the first core, and wherein the second sections include an intermediate region of the first core, the intermediate region of the first core being located between the central region and the peripheral region of the first core.

11. The catalytic device according to claim 10, wherein the first sections include at least a part of a downstream end of the second core.

12. The catalytic device according to claim 9, wherein a second core is disposed downstream of a first core, an electrode is conductively joined to the central region of the second core, the first sections include the central region of the second core and the peripheral region of the second core, and wherein the second sections include an intermediate cylindrical region of the second core located between the central region and the peripheral region of the second core.

13. The catalytic device according to claim 12, wherein the first sections include an upstream side end region in the axial direction of the first core.

14. The catalytic device according to claim 9, further including a first core, a second core located downstream of the first core, and a third core located downstream of the second core, wherein an electrode is conductively joined to the central region of the second core, and wherein the first sections include the central region and the peripheral region of the second core, and wherein the second sections include an intermediate region of the second core, the intermediate region of the second core being located between the central region and the peripheral region.

15. The catalytic device according to claim 14, wherein the first sections include an upstream side end region in the axis direction of the first core and downstream side end region in the axis section of the third core.

16. The catalytic device according to claim 3, wherein the metallic catalyst carrier includes an upstream end and a downstream end such that exhaust gas flowing through the device passes from the upstream end to the downstream end, and wherein the first sections include at least a part of the upstream end of the metallic catalyst carrier and wherein the second sections include at least a part of the upstream end of the metallic catalyst carrier.

17. The catalytic device according to claim 1, wherein a single metallic foil is alternately formed into a flat sheet part and a corrugated sheet part and the flat sheet part and the corrugated sheet part are alternately layered to form the metallic catalyst carrier.

18. The catalytic device according to claim 17, wherein the device defines a top end and a bottom end and wherein electrodes are provided at the top end and the bottom end of the layers of metallic foil of the metallic catalyst carriers.

19. The catalytic device according to claim 18, wherein the metallic catalyst carrier is formed so that the first sections include a top layer region and a bottom layer region of the metallic catalyst carrier and the second sections include an intermediate layer region between the top layer region and the bottom layer region.

20. The catalytic device according to claim 18, wherein the metallic catalyst carrier is formed so that the second sections include a top layer region and a bottom layer region of the metallic catalyst carrier and the first sections include an intermediate layer region between the top layer region and the bottom layer region.

21. The catalytic device according to claim 18, wherein the first and second sections are formed alternately from a bottom layer toward a top layer.

22. The catalytic device according to claim 1, wherein the metallic catalyst carder includes a catalyst precious metal, and wherein the amount of catalyst precious metal per unit area of the metallic catalyst carrier is greater in the second sections than in the first sections.

23. The catalytic device according to claim 1, wherein the insulation film is a film of $Al_2O_3$ formed by oxidizing metal including aluminum.

24. The catalytic device according to claim 1, wherein said conductive joints are electrically connected by electro-discharge welding.

25. The catalytic device according to claim 1, wherein the said conductive joints are electrically connected in a direction perpendicular to the layers and nonconductive parts of the first sections are not electrically connected.

* * * * *

UNITED STATES PATENT AND TRADEMARK OFFICE
CERTIFICATE OF CORRECTION

PATENT NO. : 5,554,342
DATED : September 10, 1996
INVENTOR(S) : Hiroshi HIRAYAMA, et al.

It is certified that error appears in the above-indentified patent and that said Letters Patent is hereby corrected as shown below:

Column 1, line 5, insert a comma after "abandoned".

Column 2, line 47, change XVIIII-XVIIII" to --XVIII-XVIII--.

Column 2, line 60, change "XXV-XV" to --XXV-XXV--.

Column 4, line 1, insert --metal-- after "precious".

Column 4, line 4, change "FIG. 1 to FIG. 3" to --FIGS. 1 to 3--.

Column 5, line 10, delete "the" at end of line.

Column 5, line 21, change "31" to --3l--.

Column 6, line 3, change "FIGS." to --FIG.--.

Column 6, line 23, delete "the" before "length".

Column 6, line 33, change "region" to --regions--.

Column 6, line 34, change "given" to --give--.

Column 7, line 45, change "to" to --and--.

Column 8, line 31, change "alone" to --along--.

UNITED STATES PATENT AND TRADEMARK OFFICE
CERTIFICATE OF CORRECTION

PATENT NO. : 5,554,342
DATED : September 10, 1996
INVENTOR(S) : Hiroshi HIRAYAMA, et al.

It is certified that error appears in the above-indentified patent and that said Letters Patent is hereby corrected as shown below:

Column 8, line 35, delete "state".

Column 8, line 36, after "other" insert --state--.

Column 9, line 1, change "FIGS." to --FIG.--.

Column 9, line 22, change "comprised" to --composed--.

Column 9, line 58, after "and" insert --when--.

Column 9, line 61, change "reaction," at end of line to --reaction;--.

Column 10, line 3, change "When" to --If-- and "is" to --were--.

Column 10, line 31, change "32b," to --32b;--.

Column 10, line 38, after "and" insert --the--.

Column 10, line 58, change "comprised" to --composed--.

Column 11, line 26, change "comprised" to --composed--.

Column 11, line 46, insert --a)-- before "a layer of".

UNITED STATES PATENT AND TRADEMARK OFFICE
CERTIFICATE OF CORRECTION

PATENT NO. : 5,554,342         Page 3 of 3
DATED      : September 10, 1996
INVENTOR(S): Hiroshi HIRAYAMA, et al.

It is certified that error appears in the above-indentified patent and that said Letters Patent is hereby corrected as shown below:

Column 11, line 66, insert "of" after --each--.

Column 12, line 20, insert --include-- after "sections".

Column 12, line 32, change "connectcd" to --connected--.

Column 12, line 47, change "left" to --least--.

Column 13, line 11, change "axis" to --axial-- and insert --a-- after "and".

Column 13, line 12, change "axis section" to --axial direction--.

Signed and Sealed this

Twenty-ninth Day of April, 1997

Attest:

BRUCE LEHMAN

Attesting Officer

Commissioner of Patents and Trademarks